United States Patent [19]

Peck

[11] 4,117,501
[45] Sep. 26, 1978

[54] BOX CAMERA AND PHOTOGRAPHIC KIT

[75] Inventor: John Alexander Peck, Houghton Nr. Stockbridge, England

[73] Assignee: Radionic Products Limited, Bristol, England

[21] Appl. No.: 683,163

[22] Filed: May 4, 1976

[30] Foreign Application Priority Data

Jan. 29, 1976 [GB] United Kingdom ............... 3438/76

[51] Int. Cl.² .............................................. G03B 17/50
[52] U.S. Cl. .................................... 354/89; 354/83; 354/288; 354/308; 354/333
[58] Field of Search ................. 354/83, 88, 89, 288, 354/297, 303, 304, 305, 307, 308, 331, 333, 335

[56] References Cited

U.S. PATENT DOCUMENTS

| 766,887 | 8/1904 | Leighton | 354/307 |
| 1,231,581 | 7/1917 | Farmer | 354/83 X |
| 1,285,462 | 11/1918 | Sweetland | 354/308 |
| 1,447,329 | 3/1923 | Sweetland | 354/308 |
| 1,559,795 | 11/1925 | Shlafrock | 354/89 X |
| 2,578,498 | 12/1951 | Bass | 354/89 |
| 3,785,267 | 1/1974 | Asano | 354/303 |
| 3,828,360 | 8/1974 | Dicus | 354/89 |

FOREIGN PATENT DOCUMENTS 390,479 10/1908 France ........................ 354/83

Primary Examiner—Fred L. Braun
Attorney, Agent, or Firm—Larson, Taylor and Hinds

[57] ABSTRACT

In a box camera having a front body portion and removable first and second rear body portions. The first rear body portion is removably mounted on the front body portion to focus the camera. After the camera has been focussed, the second rear body portion having a photosensitive sheet mounted therein is substituted for the first rear body for taking a photograph. The second rear body includes at least one normally closed opening for fluid ingress and egress so that it can be used as a developing chamber for the exposed sheet.

4 Claims, 10 Drawing Figures

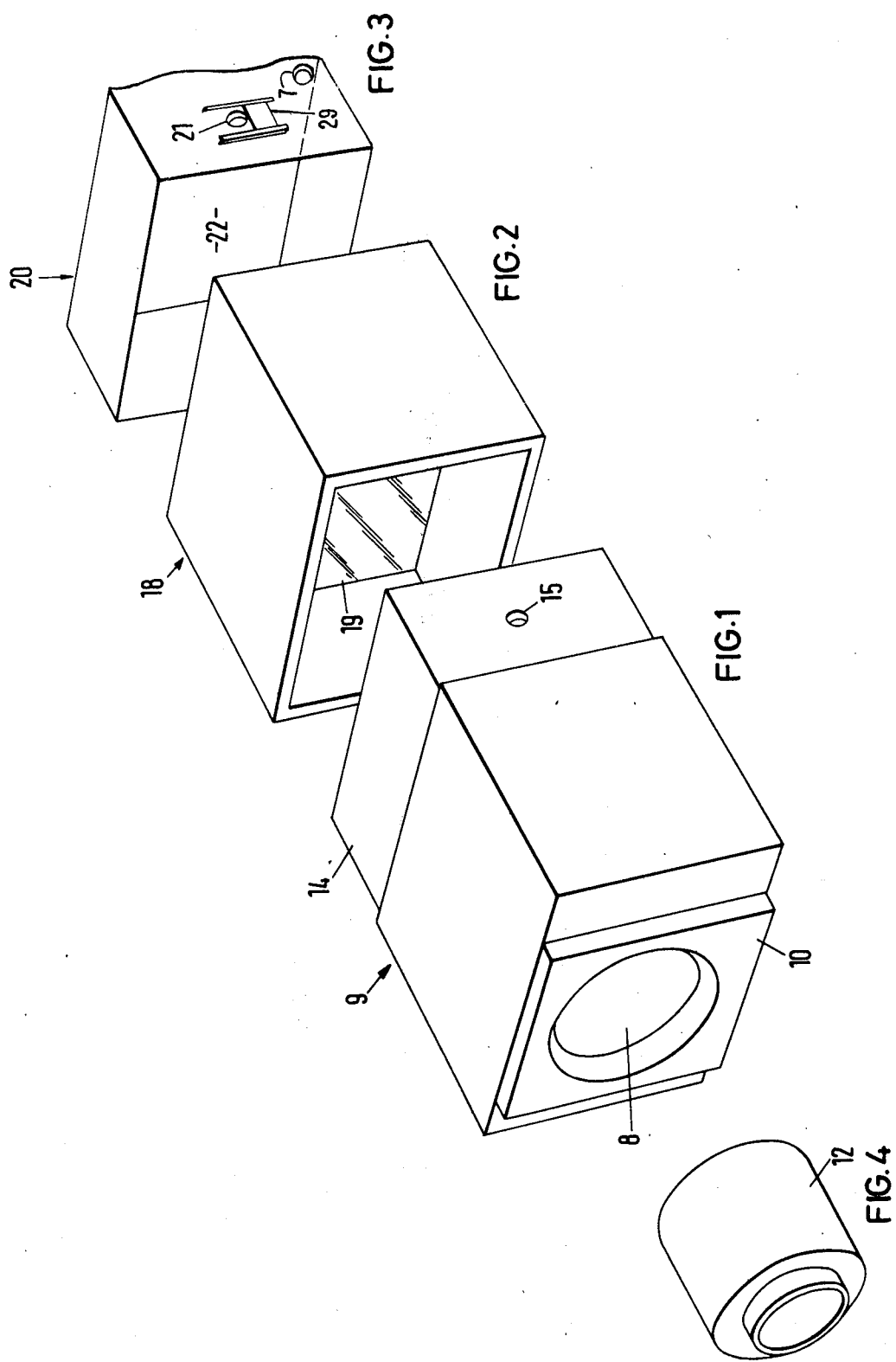

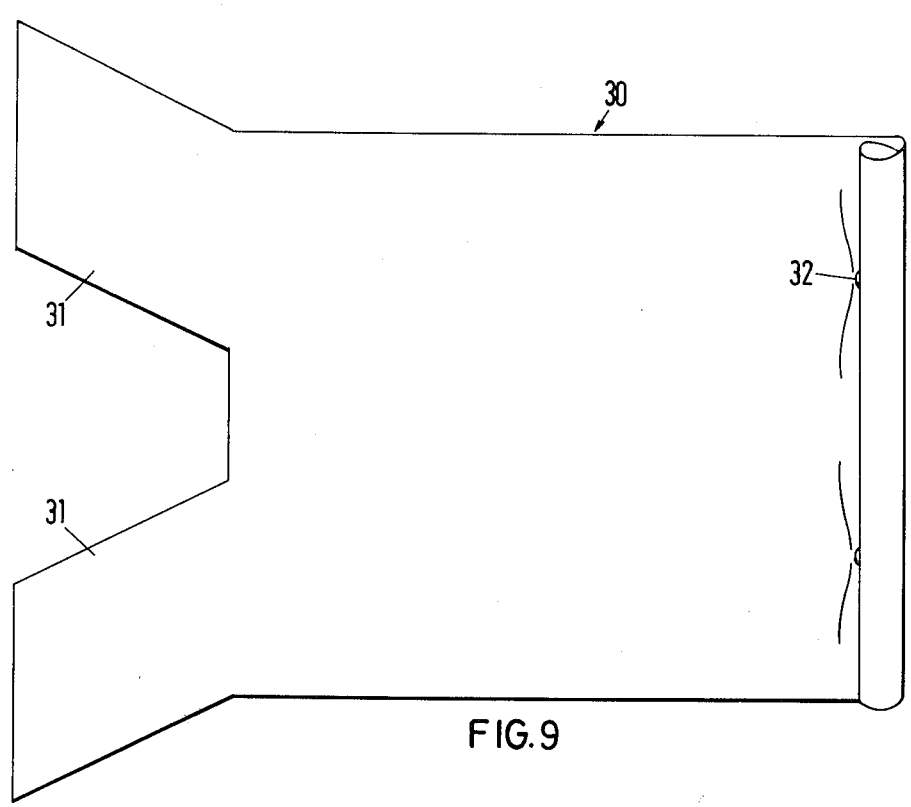
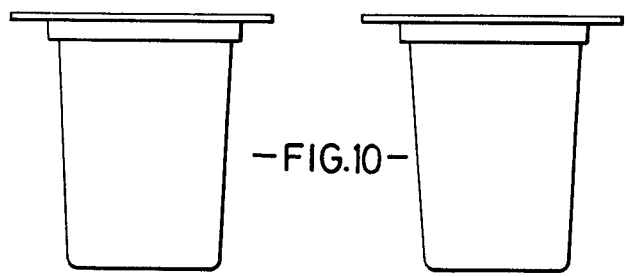
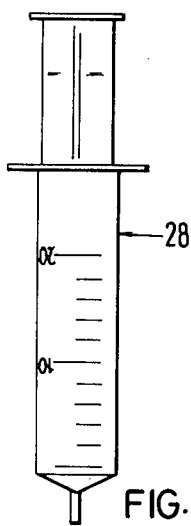
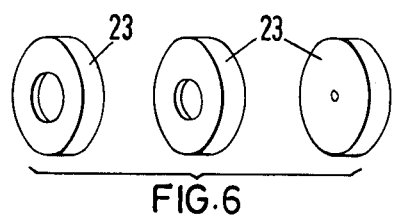
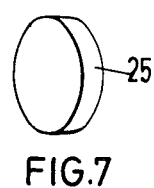
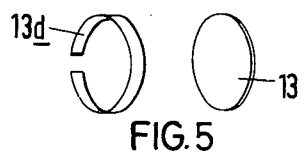

BOX CAMERA AND PHOTOGRAPHIC KIT

This invention relates to a box camera and also to a photographic kit of which the camera forms a principal part.

The invention provides a box camera whose construction enables a student of photography to control the processing within the camera of an exposed photographic paper by introducing the appropriate chemicals into the camera.

The box camera preferably forms part of a photographic kit which enables a student to load the camera with a positive photographic paper and subsequently to process the paper to provide a print without the requirement for a so-called "dark room".

The box camera is designed to use a positive photographic paper because the exposure times are longer and the processing periods shorter than the corresponding times and periods for negative film.

According to one aspect of the invention, a box camera for taking a photograph using a positive photographic paper comprises a front body portion which has an exposure aperture and a rear portion which is detachably held to the front body portion, the rear body portion providing a support for the paper during exposure and during subsequent processing of the paper within the camera, wherein the rear body portion is adapted to form a well which contains the supported paper and the camera has an opening which is normally closable but through which liquid chemicals may be introduced into the camera to process the paper in the well and a normally closed outlet through which, when open, the liquid chemicals may be drained from the camera, the opening and outlet being spaced away from the exposure aperture in the direction of the paper support so as to minimize the possibility of the liquid chemicals accidentally reaching the exposure aperture.

According to another aspect of the invention, a box camera comprises (a) a front body portion for a box camera which has an exposure aperture.

(b) a first rear body portion which incorporates a viewing screen and is adapted to be detachably mounted to the front body portion to form a simulated box camera to permit focussing of the camera, and (c) a second rear body portion which is adapted to be detachably mounted to the front body portion when the first rear body portion is detached from the front body portion to form a box camera for taking a photograph and incorporates a support for a positive photographic paper during exposure and during subsequent processing of the paper within the camera, the second rear body portion being adapted to form a processing well which contains the supported paper, (d) the second rear body portion having a closable opening through which liquid chemicals may be introduced into the camera to process an exposed photographic paper therein.

By way of example the invention will now be described with reference to a photographic kit of which the box camera forms a principal item. In the accompaying drawings, FIGS. 1-3 are perspective views of a front body portion and alternative rear body portions respectively of a box camera.

FIG. 4 shows a draw tube for a lens,

FIG. 5 shows a lens and retainer clip,

FIG. 6 shows three masks having different sizes of fixed aperture,

FIG. 7 shows a cover cap for the draw tube,

FIG. 8 shows a syringe,

FIG. 9 shows, on a smaller scale, a light-excluding loading bag, and

FIG. 10 shows two dilution beakers.

In FIG. 1 a front body portion 9 in the form of a rectangular box has an exposure aperture 8 in a thickened section 10 of a front wall to receive a draw tube 12 for holding and focussing a lens 13 (see FIG. 5). The opposing or rear end of the box is open. The rear part of the box has a smaller cross-section to provide a hollow spigot section 14. The box is provided with a small opening 15 towards its rear end for the introduction of developing and fixing liquids.

In FIG. 2 an initial or first rear body portion 18 in the form of a hollow rectangular box with an open end has a rear viewing screen 19 provided at its other end for use when focussing the camera. The screen which is transparent may be of PERSPEX material, the outer surface of which is frosted to assist the focussing operation.

In FIG. 3 a replacement or second rear body portion 20 in the form of a rectangular box having an open end is provided with a small opening 21 in a wall for the introduction of the above-mentioned liquids, the opening 21 being arranged to register with the opening 15 when the body portions 9, 20 have come together. Normally the opening 21 is closed by a slidable member 29. The end wall of the body portion 20 provides a flat supporting surface 22 for a photographic paper. The body portion 20 has a black internal surface and during processing of the exposed paper provides a well for processing liquids which contains the paper supported on the end wall surface 22. Instead of using the same opening 15, 21 both for the introduction of processing liquids and for removal of surplus liquid, the rear body portion 20 may be provided with a separate outlet, for example, outlet 7 in the end wall thereof, as shown in FIG. 3, for removal of the surplus liquid, which outlet is normally closed by a bung or other closure member. If the separate outlet is in the side of the body portion 20 near the surface 22, the spigot section 14 is withdrawn slightly from the end wall of the body portion 20 to allow drainage through the outlet.

The three body portions 9, 18, 20 are of a rigid plastics material which must not transmit light. The spigot portion 14 is adapted to enter in turn each rear body portion 18, 20 with which it makes a push-fit, the open front end of each body portion 18, 20 being adapted to abut the front body portion 9 so that the abutting portions 9, 18 or 9, 20 are held together by friction and make a flush joint. The joint is of course light-excluding.

The draw tube 12 is designed to fit into the front aperture 8 of the front body portion 9 and house a lens 13 which may be held in position by a split clip 13d. Focussing of the lens is achieved by rotation of the draw tube 12. One of the fixed-aperture masks 23 of FIG. 6 is selected for fitting over the front end of the draw tube to provide the required size of aperture. A cover cap 25, shown in FIG. 7, normally fits over the mask to exclude the light.

FIG. 8 shows a syringe 28 of plastics material which is graduated in cubic centimeters. Its spout is designed to enter the aligned openings 15, 21 of the body portions 9, 20 for injection of the processing fluids into the camera. The outer of the aligned openings, viz opening 21, is circular and of such a diameter that it is filled by the spout so as to minimise entry of light into the camera.

FIG. 9 shows a flexible bag 30 provided with arm-entry sleeves 31, the top of the bag being closable by press-studs 32. The bag is of an opaque material and may be of plastics material or linen. Its function is to provide the equivalent of a "dark room" for loading the camera. Elastic bands are used to seal the sleeves 31 about the arms of the photographer so as to ensure exclusion of light during use of the bag.

The kit further includes the following items.
(a) Pieces of photographic positive paper packed in a re-sealable pack.
(b) Container holding a known suitable developing fluid.
(c) Container holding a known suitable fixing fluid.
(d) Two dilution beakers.
(e) Instructional handbook.

The kit may be used in the following manner. The draw tube 12 containing the lens 13 but not, the cap 25 is inserted into the front aperture 8 of the front body portion 9. The front body portion is then joined to the rear body portion 18 with the spigot section 14 entering the body portion 18 to abut the screen 19. The user applies his eye to the screen 19 and rotates the draw tube 12 to focus the lens and obtain a clear reverse image on the screen. The two body portions 9, 18 are then pulled apart to separate them and the cap 25 is fitted over the end of the draw tube.

The user opens the bag 30, inserts the body portions 9, 20 and the sealed pack containing the photographic paper into the bag, closes the bag by means of the press-studs 32 and inserts his arms through the sleeves 31.

With his hands now inside the sealed bag 30, the user by feel removes a piece of photographic paper from the pack, re-seals the pack, inserts the removed paper into the rear body portion 20 so that it lies flat against the surface 22 with its light-sensitive surface facing the open end of the body portion, and then joins the body portions 9, 20 together, the spigot section 14 entering the body portion 20 to clamp the paper in position against the flat surface 22. Simultaneously the openings 15, 21 become aligned. The member 29 is in its closed position. The user withdraws his arms from the sleeves 31, opens the bag 30 and removes its contents. The now loaded box camera comprising the abutting portions 9, 20 is ready for taking a photograph.

Pointing the camera in the required direction the user removes the lens cap 25 to allow the light to pass through the lens 13 and impinge on the light-sensitive surface of the photographic paper. After an exposure of about 5–30 seconds, depending on the conditions, the lens cover cap 25 is replaced and the camera is stood on its rear end so that the paper lies at the bottom of a well provided by the body portion 20.

Previously, developing liquid from one of the containers in the kit is diluted with clean cold water in the proportion of 1:7 in one of the kit beakers. This solution is sucked up by the syringe 28, the closure member 29 is operated to uncover the opening 21 and immediately the syringe spout is inserted into the aligned openings 21, 15 and operated to inject the correct amount of solution into the camera so that the solution covers the paper in the well. The syringe is withdrawn and immediately the opening 21 is re-closed by the member 29.

After about 1½ minutes, the outlet 7 is uncovered, the camera is tilted to drain off any surplus solution through the openings 15, and then the outlet 7 is re-closed. The syringe is swilled out with clean water. The operation is repeated, using the fixing liquid and the other beaker, and waiting for at least a minute before draining off any surplus solution through the outlet 7.

Finally the body portions 9, 20 are pulled apart and the now finished print removed from the portion 20. Both body portions are then swilled out with clean water and allowed to dry.

By locating the openings 15, 21 and outlet 7 in the rear half of the camera and remote from the exposure aperture 8, the possibility of processing liquid accidentally reaching the lens 13 is rendered remote.

In this example the positive photographic paper was that marketed by Kodak Limited under the trade name "Papier Positive Direct Kodaprove Mince". This is a direct reversal black and white paper which is thin based with a matt surface and a blue-sensitive emulsion.

Instead of a lens camera, the camera may be a so-called pin-hole camera, the front body portion having a very small aperture. A kit containing such a camera would omit the draw tube, lens, cover cap and masks. The exposure aperture could be normally covered by a removable piece of opaque adhesive tape.

What we claim is:
1. A box camera comprising:
(a) a front body portion which has an exposure aperture,
(b) a first rear body portion which incorporates a viewing screen and is detachably mounted to the front body portion to form a simulated box camera to permit focussing of the camera, and
(c) a second rear body portion detachably mounted to the front body portion when the first rear body portion is detached from the front body portion to form a box camera for taking a photograph and incorporates a support for a positive photographic paper during exposure and during subsequent processing of the paper within the camera, the second rear body portion being adapted to form a processing well which contains the supported paper,
(d) the second rear body portion having a normally closed opening through which, when open liquid chemicals may be introduced into the camera to process an exposed photographic paper in the well and normally closed outlet through which, when open liquid chemicals may be drained from the camera.

2. A box camera according to claim 1 and further comprising a lens mounted to the exposure aperture in the front body portion.

3. A box camera according to claim 1, and further comprising a lens and a draw tube for holding the lens, the draw tube being mountable in the exposure aperture in the front body portion.

4. A camera according to claim 1 further comprising a loading bag of flexible light-impermeable material having a closable opening and a pair of arm sleeves which are closable at their free ends about the arms of a user, and which is removably fitted about said camera so as to enclose the front body portion and the second rear body portion and thereby enable a user to load by feel in darkness the second rear body portion with a photographic paper and then to connect that body portion to the front body portion to form the box camera.

* * * * *